(12) United States Patent
Franciosi et al.

(10) Patent No.: US 10,895,997 B2
(45) Date of Patent: Jan. 19, 2021

(54) DURABLE CLIENT-SIDE CACHING FOR DISTRIBUTED STORAGE

(71) Applicant: Nutanix, Inc., San Jose, CA (US)

(72) Inventors: Felipe Franciosi, Cambridge (GB); Miao Cui, New York, NY (US)

(73) Assignee: Nutanix, Inc., San Jose, CA (US)

( * ) Notice: Subject to any disclaimer, the term of this patent is extended or adjusted under 35 U.S.C. 154(b) by 43 days.

(21) Appl. No.: 16/281,044

(22) Filed: Feb. 20, 2019

(65) Prior Publication Data

US 2020/0264780 A1 Aug. 20, 2020

(51) Int. Cl.
*G06F 3/06* (2006.01)
*G06F 9/50* (2006.01)
*G06F 12/0802* (2016.01)
*H04L 29/08* (2006.01)

(52) U.S. Cl.
CPC ........... *G06F 3/065* (2013.01); *G06F 3/067* (2013.01); *G06F 3/0608* (2013.01); *G06F 3/0619* (2013.01); *G06F 9/5016* (2013.01); *G06F 9/5022* (2013.01); *G06F 12/0802* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 7,636,814 B1 | 12/2009 | Karr et al. | |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,772,866 B1 | 9/2017 | Aron et al. | |
| 10,346,095 B2* | 7/2019 | Joshi | G06F 3/061 |
| 2007/0061530 A1* | 3/2007 | Bourhis | G06F 11/1456 |
| | | | 711/162 |
| 2012/0159102 A1 | 6/2012 | Kan | |
| 2012/0239853 A1 | 9/2012 | Moshayedi | |
| 2015/0033002 A1* | 1/2015 | Cordero | G06F 9/45558 |
| | | | 713/1 |
| 2017/0371587 A1* | 12/2017 | Saito | G06F 3/0655 |

OTHER PUBLICATIONS

Cano, Ignacio, et al. "Curator: Self-Managing Storage for Enterprise Clusters" (Mar. 27, 2017), from https://www.usenix.org/conference/nsdi17/.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.

(Continued)

*Primary Examiner* — Charles J Choi
(74) *Attorney, Agent, or Firm* — Foley & Lardner LLP (57) ABSTRACT

Systems and methods are disclosed herein for writing data, including storing, by a storage client, a cache copy of the data in a memory of the storage client and receiving, by the storage client, acknowledgement indicating that a single replica of the data is made in a storage node remote to the storage client.

26 Claims, 3 Drawing Sheets

(56) References Cited

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jan. 8, 2019), from https://nutanixbible.com/.
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Tajbakhsh, Shahriar, "Understanding write-through, write-around and write-back caching (with Python)" (Aug. 20, 2017), from https://shahriar.svbtle.com/Understanding-writethrough-writearound-and-writeback-caching-with-python.

* cited by examiner

DURABLE CLIENT-SIDE CACHING FOR DISTRIBUTED STORAGE

BACKGROUND

The following description is provided to assist the understanding of the reader. None of the information provided or references cited is admitted to be prior art.

In a non-hyperconverged context, compute entities and storage entities exist separately (e.g., are located on different nodes) in a distributed storage system. The compute entities (e.g., compute nodes) and the storage entities (e.g., storage nodes) communicate over a network for functions such as reads and writes. In that regard, the compute entities can be seen as a storage client. That is, the compute entities must reach over a network in order to access data stored in the storage entities for reads and writes.

Distributed storage systems (e.g., the Nutanix™ platform) implements resilient storage, which refers to making duplicate copies of data in the storage entities to ensure data redundancy and availability in case of failure or corruption of a node/disk. For example, to achieve resilient distributed storage, the storage system typically replicates at least two copies of data in the storage entities to ensure that any node/disk failure would not cause data loss or unavailability.

SUMMARY

In accordance with at least some aspects of the present disclosure, a method for writing data in a distributed storage system includes storing, by a storage client, a cache copy of the data in a memory of the storage client and receiving, by the storage client, acknowledgement indicating that a single replica of the data is made in a storage node remote to the storage client.

In accordance with at least some aspects of the present disclosure, a distributed storage system includes a storage backend and a storage client configured to write data to the storage backend. The storage client is configured to make a cache copy of the data in a memory of the storage client and receive acknowledgement from one of a plurality of storage nodes of the storage backend indicating that one replica of the data is made in the one of the plurality of storage nodes.

In accordance with at least some aspects of the present disclosure, a non-transitory computer readable media includes computer-executable instructions embodied thereon that, when executed by a processor a storage client, cause the processor to store a cache copy of the data in a memory of the storage client and receive acknowledgement indicating that a single replica of the data is made in a storage node remote to the storage client.

The foregoing summary is illustrative only and is not intended to be in any way limiting. In addition to the illustrative aspects, implementations, and features described above, further aspects, implementations, and features will become apparent by reference to the following drawings and the detailed description.

The foregoing and other features of the present disclosure will become apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A storage client (e.g., a compute entity, a compute node, a host, or so on) is configured to process (e.g., read, write, and so on) data stored in a storage node (e.g., a storage entity, a storage backend, and so on) in a distributed storage system. That is, in a non-hyperconverged system, the storage client is configured to retrieve data from the storage node over a network for processing. To provide resilient distributed storage, a traditional distributed storage system requires at least two copies of any data to be stored in the storage nodes.

The storage client of a traditional distributed storage system may store a cached copy of the data locally such that reading the data does not require the data to be retrieved over a network from a storage node which stores a copy of the data. Therefore, at the expense of extra local storage space in the storage client, making the cached copy (in addition to the at least two copies of the data stored in the storage nodes) for reads reduces network traffic and improves read speed in a traditional distributed storage system.

When a storage client writes data in a traditional distributed storage system, the storage client makes a cached copy of the data locally and remotes to one or more storage nodes by sending the data over the network to the one or more storage nodes. The write is considered to be complete after the storage client receives acknowledgement that the at least two replicas have been successfully made as traditionally required. Accordingly, a traditional distributed storage system writes data much slower than a hyperconverged system which configures hyperconverged nodes to write data locally, making it unnecessary to reach over the network to any remote storage to make two replicas of data as traditionally required.

Implementations described herein relate to systems, methods, apparatuses, and non-transitory computer-readable medium for providing resilient distributed storage to prevent data loss or unavailability. In a distributed storage system, a cached copy of data that is locally stored by a storage client can be used as a durable replica of the data. That is, the storage client does not need to wait for the storage nodes (which communicate with the storage client over a network) to make a secondary replica. In other words, the storage client considers the write to be complete responsive to receiving acknowledgement that one replica of the data is made by a storage node.

Figure 1:
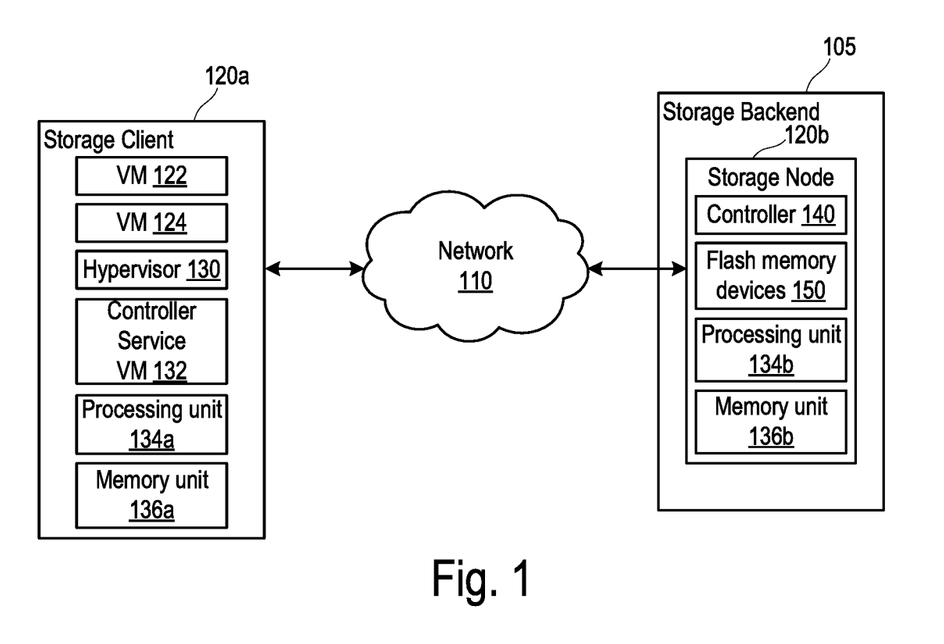
FIG. 1 is a block diagram of a system including a storage client and a storage node, in accordance with some implementations described in the present disclosure.

FIG. 1 is a block diagram of a system 100 including a storage client 120a and a storage node 120b, according to some implementations described in the present disclosure. Referring to FIG. 1, the system 100 corresponds to a datacenter, a cluster, a compute system, or another system configured to provide computing and storage capabilities for one or more clients (not shown). In that regard, while FIG. 1 shows the one storage client 120a and the one storage node 120b, the system 100 may include multiple storage clients (such as but not limited to, the storage client 120a) and multiple storage nodes (such as but not limited to, the storage node 120b). Additional multiple storage clients and storage nodes are not shown for clarity.

In some examples, the system 100 is a distributed storage system having a storage backend 105 connected to the storage client 120 via a network 110, where the storage backend 105 is configured to store data, information, objects, images, snapshots, and so on for the storage client 120. The storage client 120a may be a compute entity, a compute node, a host, or another entity configured to perform data processing functions (e.g., read, write, and so on) for data stored in the storage backend 105. The storage client 120a is thus a "client" of the storage backend 105. The storage backend 105 includes the multiple storage nodes, including the storage node 120b. FIG. 1 illustrates a non-hyperconverged aspect of the system 100 in that the storage client 120a performs the data processing functions for data stored remotely in the storage node 120b as well as other nodes in the storage backend 105 that are not shown. In that regard, the storage client 120 is remote to the storage backend 105 (e.g., the storage node 120b) given that the storage client 120 is connected to the storage backend 105 via the network 110. The system 100 may further include one or more hyperconverged nodes (not shown), each of which has both data processing and storage capabilities.

In some examples, the data processing capabilities of the storage client 120a correspond to provisioning virtual machines (VMs) 122 and 124 in the manner described. Services commensurate with the VMs 122 and 124 can be provided to the clients under respective service level agreements (SLAs), which may specify performance requirements. In other examples, the data processing capabilities of the storage client 120a have other implementations, such as but not limited to, providing compute functionalities of a datacenter of a compute system.

In some implementations, each of the nodes 120a and 120b can be a hardware device such as but is not limited to a server. For example, one or both of the nodes 120a and 120b may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other examples, one or both of the nodes 120a and 120b can be another type of device that is suitable for use as a node within the system 100.

As shown, the storage client 120a includes the VMs 122 and 124, a hypervisor 130, a controller/service VM 132, a processing unit 134a, and a memory unit 136a. The storage node 120b includes a controller 140, flash memory devices 150, a processing unit 134b, and a memory unit 136b.

Each of the VMs 122 and 124 is a software-based implementation of a computing machine. The VMs 122 and 124 emulate functionalities of a physical computer. Specifically, the hardware resources such as but not limited to, the processing unit 134a, the memory unit 136a, and so on of the underlying computer (e.g., the storage client 120a) are virtualized or transformed by the hypervisor 130 into the underlying support for each of the VMs 122 and 124. Each of the VMs 122 and 124 may run its own operating system (OS) and applications on the underlying physical resources in a manner similar to an actual computer. By encapsulating an entire machine, including central processing unit (CPU), memory, operating system, storage devices, and network devices, the VMs 122 and 124 can be configured to be compatible with standard OSs (e.g. Windows, Linux, etc.), applications, and device drivers. While the VMs 122 and 124 are shown, fewer or greater number of VMs can be supported by the storage client 120a.

The VMs 122 and 124 may be managed by the hypervisor 130. The hypervisor 130 is a virtual machine monitor that allows a single physical server computer to run multiple instances of VMs. For example, the storage client 120a can run the VMs 122 and 124. The VMs 122 and 124 share the resources of that physical server computer (the storage client 120a, including the processing unit 134a and the memory unit 136a), potentially across multiple environments. By running multiple VMs on a node, multiple workloads and multiple OSs can be run on a single piece of underlying hardware computer to increase resource utilization and manage workflow. The hypervisor 130 may be configured to run virtualization software such as but not limited to, ESXi from VMWare, AHV from Nutanix, Inc., XenServer from Citrix Systems, Inc., etc., for running the VMs 122 and 124, for managing the interactions among the VMs 122 and 124 and other VMs located on other nodes, and for managing the underlying hardware of the storage client 120a.

In some examples, the VMs 122 and 124 are controlled and managed by the controller/service VM 132. The controller/service VM 132 is configured to communicate with other controller/service VMs (not shown) via the network 110 to form a distributed system. The controller/service VM 132 and the hypervisor 130 can be configured as suitable for use within the system 100. The controller/service VM 132 is configured to manage, route, and otherwise handle workflow requests to and from the VMs 122 and 124. The controller/service VM 132 is connected to the network 110 to facilitate communications among the nodes in the system 100, and thus to facilitate communications among the VMs 122 and 124 and well as other VMs provided by other nodes (not shown). In some implementations, the hypervisor 130 can be connected to the network 110.

The network 110 may include one or more of a cellular network, Wi-Fi, Wi-Max, ZigBee, Bluetooth, a proprietary network, Ethernet, one or more twisted pair wires, coaxial cables, fiber optic cables, local area networks, Universal Serial Bus ("USB"), Thunderbolt, or any other type of wired or wireless network, or a combination thereof. The network 110 may be structured to permit the exchange of data, instructions, messages, or other information among the storage client 120a (e.g., a VM) and the storage node 120b (e.g., a file storage for the VM).

The storage client 120a and the storage node 120b include the processing units 134a and 134b, respectively, configured to execute instructions commensurate with functions described relative to the storage client 120a and the storage node 120b. The processing units 134a and 134b correspond to special purpose computers, logic circuits, or hardware circuits of the storage client 120a and the storage node 120b, respectively. The processing units 134a and 134b may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 134a and 134b, thus, execute an instruction, meaning that they perform the operations called for by that instruction. The VMs 122 and 124, the hypervisor 130, and the controller/service VM 132 can be implemented with the processing unit 134a. The controller 140 and the flash memory devices 150 can be implemented with the processing unit 134b.

The storage client 120a and the storage node 120b include the memory units 136a and 136b, respectively, configured to store data. The instructions executed by the processing unit 134a are stored in the memory unit 136a. The instructions executed by the processing unit 134b are stored in the memory unit 136b. Examples of each of the memory units 136a and 136b include but are not limited to, dynamic random-access memory (DRAM), solid state drive (SSD), and the like.

As described, the storage node 120b includes a file storage (e.g., a software-based implementation of a storage) configured to store files for the storage client 120a. In the examples in which the storage client 120a provisions the VMs 122 and 124, the storage node 120b stores data or files for workloads corresponding to one or both of the VMs 122 and 124. For example, the storage node 120b can store a vDisk for one or both of the VMs 122 and 124. In some examples, a vDisk is a logical storage (e.g., including contiguous data chunks) virtualized from local storage devices (e.g., the flash memory devices 150, and so on).

As shown, the file storage for the VMs 122 and 124 are located on a different node (the storage node 120b or another storage node) as that of the VMs 122 and 124. The storage client 120a may be a compute-only node, which is capable of provisioning the VMs 122 and 124 but not any file storages therefor. The VMs 122 and 124 are configured to handle communications (e.g., I/O operations) in connection with the file storage provided by the storage node 120b or another storage node of the system 100. Examples of types of I/O operations or actions include but are not limited to, cache reference, DRAM access, memory (e.g., SSD) read, memory (e.g., SSD) write, disk seek, sending packets over the network 110, and so on. Given that the VMs 122 and 124 and the associated file storages are not co-located on a same node, the I/O communications between the VMs 122 and 124 (and therefore the storage client 120a) and the associated file storage (provided by the storage node 120b or another storage node) are routed via the network 110.

The storage node 120b uses the flash memory devices 150 to store data, information, objects, images, snapshots, and so on for the workloads (e.g., one or both of the VMs 122 and 124) of the storage client 120a. The flash memory devices 150 are non-volatile memory devices such as but not limited to, NAND flash memory, NOR flash memory, and the like. In some examples, the flash memory devices 150 form an SSD device.

The controller 140 can combine raw data storage in the flash memory devices 150 such that those flash memory devices 150 function like a single disk drive. The controller 140 can include microcontrollers, buffers, error correction functionality, flash translation layer (FTL), and flash memory interface modules for implementing such functions. In that regard, the flash memory devices 150 can be referred to as a "disk" or a "drive." As described, the controller 140 includes suitable processing and memory capabilities for executing functions described herein. As described, the controller 140 manages various features for the flash memory devices 150 including, but not limited to, I/O handling, reading, writing, erasing, monitoring, logging, error handling, garbage collection, wear leveling, logical to physical address mapping and the like.

In addition to or as an alternative to the SSD device, the storage node 120b can include electrically erasable programmable read-only memory (EEPROM), a non-volatile dual in-line memory module (NVDIMM), a non-volatile memory express (NVMe) device, and so on configured to store data, information, objects, images, snapshots, and so on for the workloads (e.g., one or both of the VMs 122 and 124) of the storage client 120a.

Figure 2:
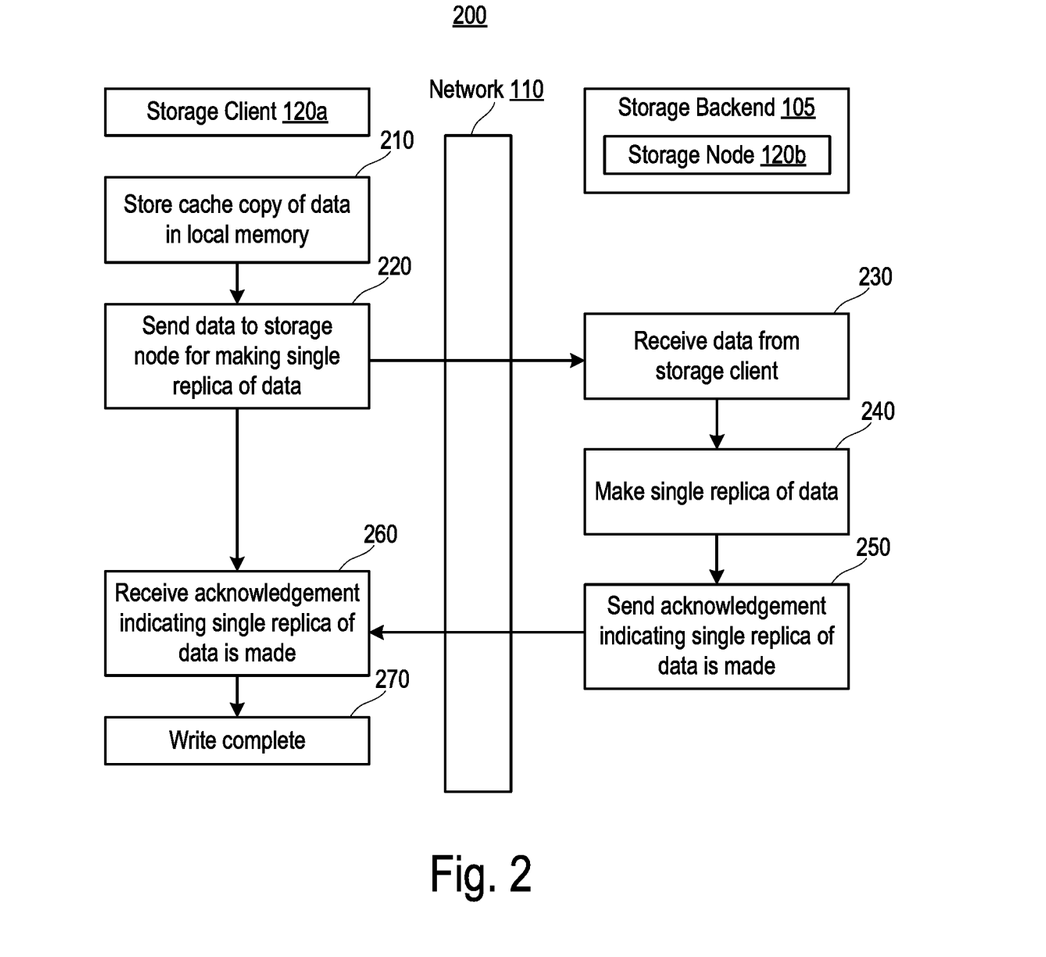
FIG. 2 is a flowchart outlining operations for a method for writing data in the system shown in FIG. 1, according to some implementations of the present disclosure.

FIG. 2 is a flowchart outlining operations for a method 200 for writing data in the system 100 (FIG. 1), according to some implementations of the present disclosure. Referring to FIGS. 1-2, the method 200 seeks to use a cache copy of the data made at a local memory (e.g., the memory unit 136a) of the storage client 120a as a durable replica of data, such that the storage client 120a can receive acknowledgement that write is complete from the storage backend 105 after a single (no more than one) replica of the data is made at the storage backend 105 (e.g., at the storage node 120b).

In supporting the workloads (e.g., the VM 122 or 124) of the storage client 120a, the storage client 120a may write data to the storage backend 105. At 210, the processing unit 134a is configured to store a cache copy of the data in local memory (e.g., the memory unit 136a) of the storage client 120a. The cache copy is made at a cache layer of the memory unit 136a. In some examples, the cache copy is made in a non-volatile memory device of the memory unit 136a. Instead of treating the cache copy of the data as merely a cache copy for faster reads, the cache copy is a durable replica of the data such that only another durable replica is needed in the storage backend 105 (before the cache layer is flushed due to workload termination as described with respect to FIG. 3).

At 220, the processing unit 134a is configured to send the data to the storage backend 105 (e.g., to the storage node 120b) for making the single replica of the data. The data is sent over the network 110. The storage client 120a does not otherwise send the data to another storage node of the storage backend 105.

At 230, the storage node 120b receives the data from the storage client 120a over the network 110. At 240, the storage node 120b (e.g., the controller 140) makes the single replica of the data, for example, in one of the flash memory devices 150 or in another suitable memory device in any suitable manner. At 250, the storage node 120b sends, via the network 110, an acknowledgement indicating that the single replica of the data is made in the storage backend 105 (in the storage node 120b). The storage node 120b does not make two replicas of the data, and the storage node 120b does not send the data to another storage node of the storage backend 105 for making any additional replica in addition to the single replica made in the storage node 120b.

The cache copy and the copy at the storage backend 105 can be made simultaneously. That is, block 210 and blocks 220/230 may occur simultaneously. In some examples, responsive to obtaining the data, block 210 and block 220 are executed simultaneously. In other implementations, the block 210 and blocks 220/230 may occur sequentially in any suitable order.

At 260, the storage client 120a receives, via the network 110, the acknowledgement indicating that the single replica of the data is made in the storage node 120b. At 270, the storage client 120a treats the write operation as complete. The acknowledgement is configured to notify the storage client 120a that a number of replicas of the data has been made in the storage backend 105, where the number of replicas is one. In other words, the acknowledgement is configured to notify the storage client 120a that no more than one replica of the data has been made in the storage backend 105.

Figure 3:
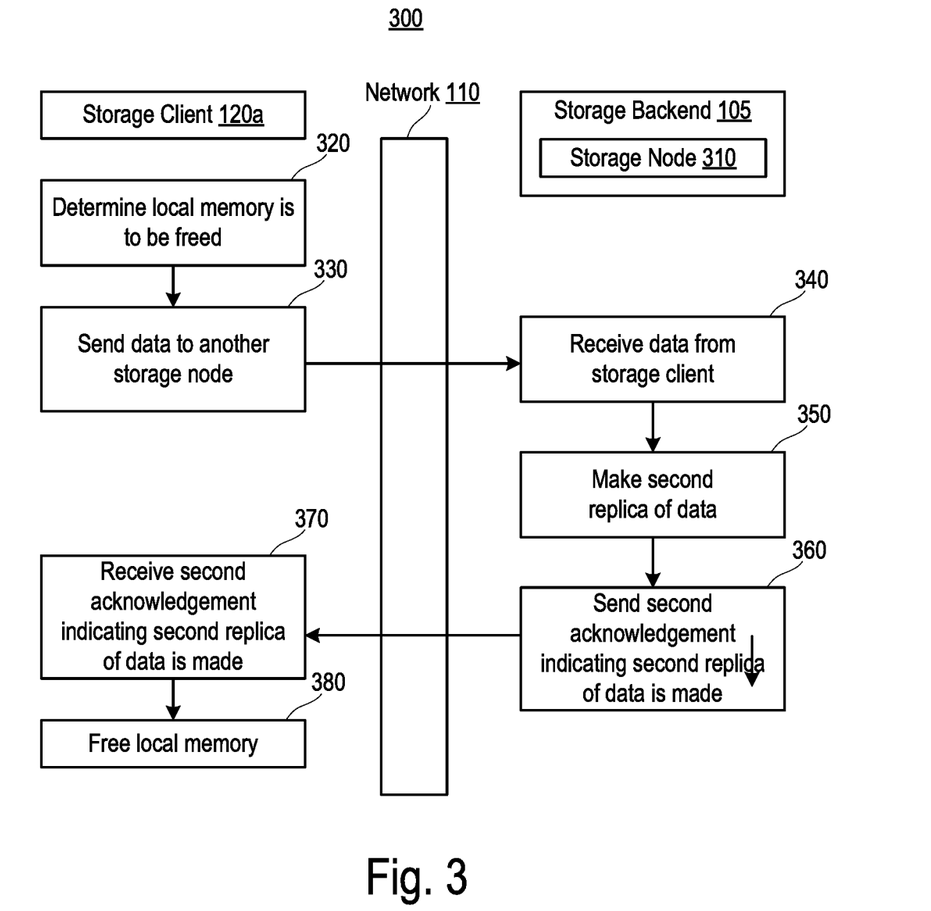
FIG. 3 is a flowchart outlining operations for a method for writing data in the system shown in FIG. 1, according to some implementations of the present disclosure.

FIG. 3 is a flowchart outlining operations for a method 300 for writing data in the system 100 (FIG. 1), according to some implementations of the present disclosure. Referring to FIGS. 1-3, the method 300 may be executed after the method 200 is performed. For example, in response to any cache cleaning implemented by the storage client 120a, to assure that at least two durable replicas of the data are present in the system 100, the cached copy may be flushed to another storage node 310 of the storage backend 105 before the cache layer in which the cache copy is stored is erased or otherwise freed. The storage node 310 may be a storage node such as but not limited to, the storage node 120b.

At 320, the processing unit 134a determines that a portion of the local memory (e.g., the memory unit 136a) that contains the cache copy of the data is to be freed. The processing unit 134a determines that the portion of the local memory is to be freed responsive to determining at least one of additional storage space in the local memory is needed, a workload (e.g., the VM 122) associated with the cache copy is being migrated to another compute node, the workload (e.g., the VM 122) associated with the cache copy of the data is being shut down, or so on.

At 330, the processing unit 134a is configured to send the data (e.g., the cached copy) over the network 110 to the storage node 310. At 340, the storage node 310 receives the data from the storage client 120a. At 350, the storage node 310 (e.g., a controller such as but not limited to, the controller 140) makes a second replica of the data, for example, in a flash memory device or in another suitable memory device of the storage node 310 in any suitable manner. At this point, the storage backend 105 has two replicas of the data—one in the storage node 120b, and another in the storage node 310. At 360, the storage node 310 sends, via the network 110, a second acknowledgement indicating that the second replica of the data is made in the storage backend 105 (in the storage node 310).

The storage client 120a receives the second acknowledgement indicating that the second replica is made at 370. At 380, the processing unit 134a frees the portion of the local memory that stores the cache copy in response to receives the second acknowledgement.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A non-transitory computer readable media includes computer-executable instructions embodied thereon that, when executed by a processor, cause the processor to:
   store a cache copy of a data in a memory of a storage client;
   receive write acknowledgement indicating that a single replica of the data is made in a storage node remote to the storage client;
   determine that the memory is to be freed responsive to determining a workload on the storage client associated with the cache copy is being moved to another node;
   send the data to another storage node for making an additional replica of the data in response to determining that the memory is to be freed.

2. The non-transitory computer readable media of claim 1, wherein the cache copy is a durable replica of the data.

3. The non-transitory computer readable media of claim 1, wherein the cache copy is made at a cache layer of the memory of the storage client.

4. The non-transitory computer readable media of claim 1, wherein the processor is further caused to free a portion of the memory storing the cache copy.

5. The non-transitory computer readable media of claim 1, wherein the storage client is a compute node.

6. The non-transitory computer readable media of claim 1, wherein the processor is further caused to send the data to the storage node for making the single replica of the data.

7. The non-transitory computer readable media of claim 1, wherein the processor is further caused to
   receive another acknowledgement indicating that the additional replica of the data is made in the another storage node.

8. The non-transitory computer readable media of claim 7, wherein the memory is freed responsive to receiving the another acknowledgement.

9. The non-transitory computer readable media of claim 1, wherein the processor determines that the memory is to be freed responsive to further determining additional space is needed in the memory.

10. The non-transitory computer readable media of claim 1, wherein
    the acknowledgement is configured to notify the storage client that a replica of the data has been made in a storage backend of the storage client;
    the storage backend is connected to the storage client via a network; and
    the storage backend comprises the storage node.

11. A storage client comprising:
    a memory; and
    a processor with programmed instructions to:
    store a cache copy of data in the memory;
    receive an acknowledgement indicating a single replica of the data is made in a storage node remote to the storage client;

determine that the memory is to be freed responsive to determining a workload on the storage client associated with the cache copy is being moved to another node;

send the data to another storage node for making an additional replica of the data in response to determining that the memory is to be freed.

12. The storage client of claim 11, wherein the cache copy is a durable replica of the data.

13. The storage client of claim 11, wherein the cache copy is made at a cache layer of the memory.

14. The storage client of claim 11, wherein the processor has further programmed instructions to free a portion of the memory storing the cache copy.

15. The storage client of claim 11, wherein the processor has further programmed instructions to send the data to the storage node for making the single replica of the data.

16. The storage client of claim 11, wherein the processor has further programmed instructions to receive another acknowledgement indicating that the additional replica of the data is made in the another storage node.

17. The storage client of claim 16, wherein the memory is freed responsive to receiving the another acknowledgement.

18. The storage client of claim 11, wherein the memory is a portion of memory in a flash memory.

19. A method comprising:

storing, by a storage client, a cache copy of a data in a memory of the storage client;

receiving, by the storage client, acknowledgement indicating that a single replica of the data is made in a storage node remote to the storage client;

determining, by the storage client, that the memory is to be freed responsive to determining a workload on the storage client associated with the cache copy is being moved to another node; and sending, by the storage client, the data to another storage node for making an additional replica of the data in response to determining that the memory is to be freed.

20. The method of claim 19, further comprising sending the data to the storage node for making the single replica of the data.

21. The method of claim 19, further comprising receiving another acknowledgement indicating that the additional replica of the data is made in the another storage node.

22. The method of claim 21, wherein the memory is freed responsive to receiving the another acknowledgement.

23. The method of claim 19, wherein the memory to be freed is a portion of a non-volatile memory local to the storage client.

24. The method of claim 19, wherein the cache copy is a durable replica of the data.

25. The method of claim 19, wherein the cache copy is made at a cache layer of the memory.

26. The method of claim 19, wherein the storage client is a compute node.

* * * * *